United States Patent
Combs et al.

(10) Patent No.: US 10,417,001 B2
(45) Date of Patent: Sep. 17, 2019

(54) PHYSICAL REGISTER TABLE FOR ELIMINATING MOVE INSTRUCTIONS

(71) Applicant: Intel Corporation, Santa Clara, CA (US)

(72) Inventors: Jonathan D. Combs, Austin, TX (US); Venkateswara R. Madduri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 13/728,416

(22) Filed: Dec. 27, 2012

(65) Prior Publication Data

US 2014/0189324 A1 Jul. 3, 2014

(51) Int. Cl.
  *G06F 9/30* (2018.01)
  *G06F 9/38* (2018.01)
  *G06F 12/02* (2006.01)

(52) U.S. Cl.
  CPC .......... *G06F 9/384* (2013.01); *G06F 9/30032* (2013.01); *G06F 12/0292* (2013.01)

(58) Field of Classification Search
  None
  See application file for complete search history.

(56) References Cited

U.S. PATENT DOCUMENTS

| | | | | |
|---|---|---|---|---|
| 4,831,515 A * | 5/1989 | Kamada | ................ | G06F 9/3889 712/217 |
| 5,499,352 A * | 3/1996 | Clift | .................... | G06F 9/30032 711/202 |
| 5,574,927 A * | 11/1996 | Scantlin | .............. | G06F 9/30036 703/23 |
| 5,613,132 A * | 3/1997 | Clift | ....................... | G06F 9/3836 712/217 |
| 5,826,094 A * | 10/1998 | Colwell | ................ | G06F 9/3824 712/23 |
| 6,035,391 A * | 3/2000 | Isaman | ............... | G06F 9/30032 712/221 |
| 6,047,369 A * | 4/2000 | Colwell | ............. | G06F 9/30032 712/217 |
| 6,349,380 B1 * | 2/2002 | Shahidzadeh | ....... | G06F 12/0292 711/205 |
| 6,356,918 B1 * | 3/2002 | Chuang | ................. | G06F 9/3836 |

(Continued)

OTHER PUBLICATIONS

'Dynamically Reducing Pressure on the Physical Register File through Simple Register Sharing' by Tran et al., 2004 International Symposium on Performance Analysis of Systems and Software.*

(Continued)

*Primary Examiner* — Steven G Snyder
(74) *Attorney, Agent, or Firm* — Nicholson De Vos Webster & Elliott LLP (57) ABSTRACT

Embodiments of an invention for a physical register table for eliminating move instructions are disclosed. In one embodiment, a processor includes a physical register file, a register allocation table, and a physical register table. The register allocation table is to store mappings of logical registers to physical registers. The physical register table is to store entries including pointers to physical registers in the mappings. The number of entry locations in the physical register table is less than the number of physical registers in the physical register file.

15 Claims, 4 Drawing Sheets

(56) References Cited

U.S. PATENT DOCUMENTS

| | | | | |
|---|---|---|---|---|
| 6,421,696 | B1* | 7/2002 | Horton | G06F 17/142 708/404 |
| 6,505,293 | B1* | 1/2003 | Jourdan | G06F 9/30032 712/216 |
| 6,594,754 | B1* | 7/2003 | Jourdan | G06F 9/30167 712/216 |
| 6,625,723 | B1* | 9/2003 | Jourday | G06F 9/3824 712/216 |
| 6,792,523 | B1* | 9/2004 | Glew | G06F 9/30036 711/221 |
| 7,155,599 | B2* | 12/2006 | Jourdan | G06F 9/3836 712/227 |
| 9,256,433 | B2* | 2/2016 | Anderson | G06F 9/30181 |
| 9,405,542 | B1* | 8/2016 | Schuttenberg | G06F 9/3842 |
| 9,454,371 | B2* | 9/2016 | Madduri | G06F 9/30032 |
| 2002/0087836 | A1* | 7/2002 | Jourdan | G06F 9/3836 712/217 |
| 2004/0015904 | A1* | 1/2004 | Jourdan | G06F 9/3838 717/141 |
| 2005/0027968 | A1* | 2/2005 | Rupley, II | G06F 9/30036 712/217 |
| 2009/0327661 | A1* | 12/2009 | Sperber | G06F 9/30098 712/217 |
| 2011/0161616 | A1* | 6/2011 | Tarjan | G06F 9/384 711/170 |
| 2012/0265969 | A1* | 10/2012 | Alexander | G06F 9/30098 712/220 |
| 2014/0068230 | A1* | 3/2014 | Madduri | G06F 9/30032 712/216 |
| 2014/0281432 | A1* | 9/2014 | Anderson | G06F 9/30181 712/226 |
| 2018/0165199 | A1* | 6/2018 | Brandt | G06F 12/0831 |

OTHER PUBLICATIONS

'CSE 533: Advanced Computer Architectures—Dynamic Instruction Scheduling: Register Renaming' by Gürhan Küçuk, Yeditepe University, 2007.*

'Structured Computer Organization' Second Edition, by Andrew S. Tanenbaum, copyright 1984 by Prentice-Hall, pp. 10-11. (Year: 1984).*

\* cited by examiner

PHYSICAL REGISTER TABLE FOR ELIMINATING MOVE INSTRUCTIONS

FIELD

Embodiments of the present invention relate to computer technology, and more particularly, to processor architecture.

BACKGROUND

For many processors, executing a move instruction usually involves moving a value from one register to another register, or moving an immediate to a register. Because of the frequency of such move instructions, processor performance may be increased if move instructions are efficiently processed.

Most instructions operate on several source operands and generate results. They name, either explicitly or through an indirection, the source and destination locations where values are read from or written to. A name may be either a logical (architectural) register or a location in memory.

Usually, the number of physical registers available in a processor exceeds the number of logical registers, so that register renaming may be utilized to increase performance. In particular, for out-of-order processors, register renaming allows instructions to be executed out of their original program order. Thus, for many out-of-order processors, a move instruction is renamed so that logical registers named in the original move instruction are renamed to physical registers.

Renaming a logical register involves mapping a logical register to a physical register. These mappings are stored in a RAT (register alias table or register allocation table). A RAT maintains the latest mapping for each logical register. A RAT is indexed by logical registers, and provides mappings to corresponding physical registers.

DETAILED DESCRIPTION OF THE EMBODIMENTS

Embodiments of an invention for a physical register table for eliminating move instructions are described. In this description, various specific details, such as component and system configurations, may be set forth in order to provide a more thorough understanding of the present invention. It will be appreciated, however, by one skilled in the art, that the invention may be practiced without such specific details. Additionally, to avoid unnecessarily obscuring the present invention, some well-known structures, circuits, and other features have not been shown in detail.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention. The term "increment" may be used to mean increase by one, but embodiments of the present invention may be possible in which "increment" may mean increase by a fixed value, and in other embodiments it may be possible to decrement or decrease instead of increment or increase. However, not every such possibility is described.

Figure 2:
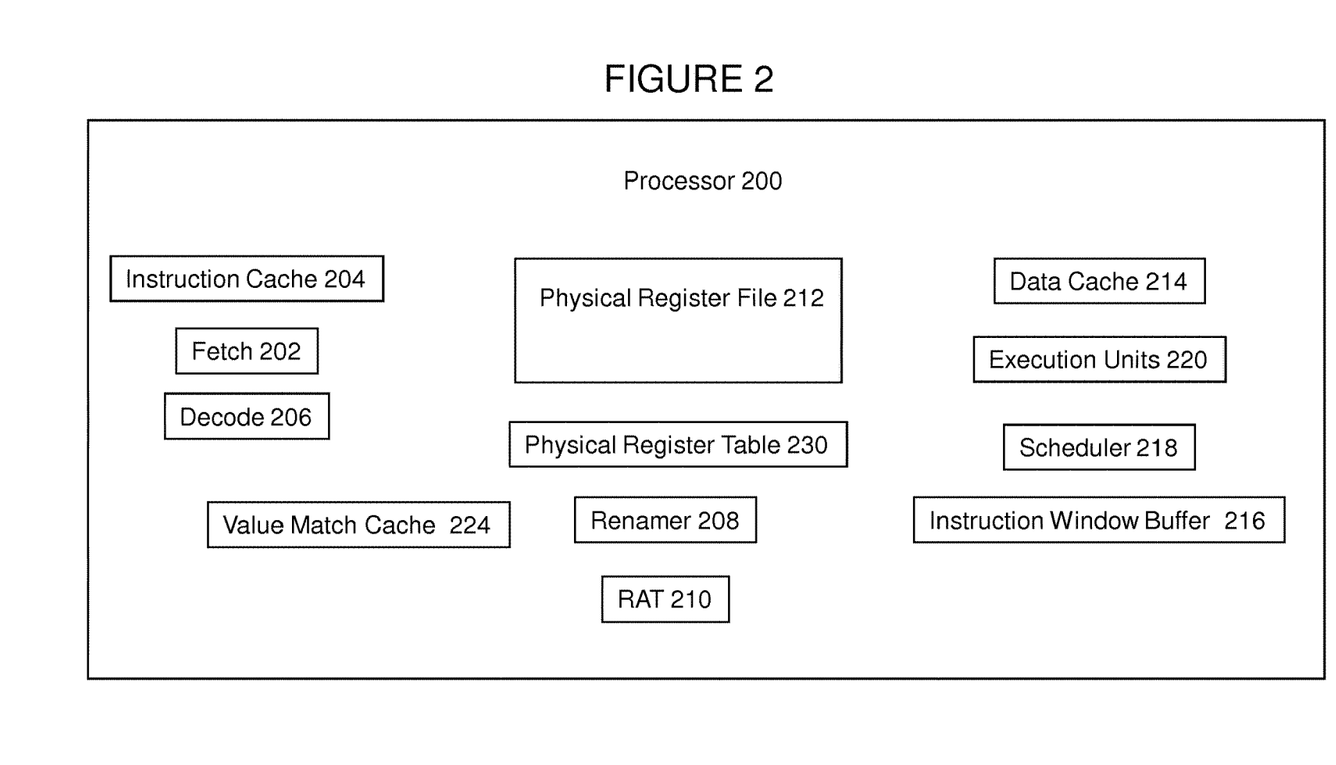
FIG. 2 illustrates the high level architecture of a processor according to an embodiment of the present invention.

Embodiments of the present invention may be described by referring to out-of-order processor 200 of FIG. 2. (For simplicity, not all functional units of processor 200 are illustrated.) In processor 200, fetch unit 202 fetches instructions from instruction cache 204, and decode unit 206 decodes these instructions. For a CISC (Complex Instruction Set Computer) architecture, decode unit 206 decodes a complex instruction into one or more micro-instructions. Usually, these micro-instructions define a load-store type architecture, so that micro-instructions involving memory operations are simple load or store operations. However, the present invention may be practiced for other architectures, such as for example RISC (Reduced Instruction Set Computer) or VLIW (Very Large Instruction Word) architectures.

In a RISC architecture, instructions are not decoded into micro-instructions. Because the present invention may be practiced for RISC architectures as well as CISC architectures, we shall not make a distinction between instructions and micro-instructions unless otherwise stated, and will simply refer to these as instructions.

Figure 1:
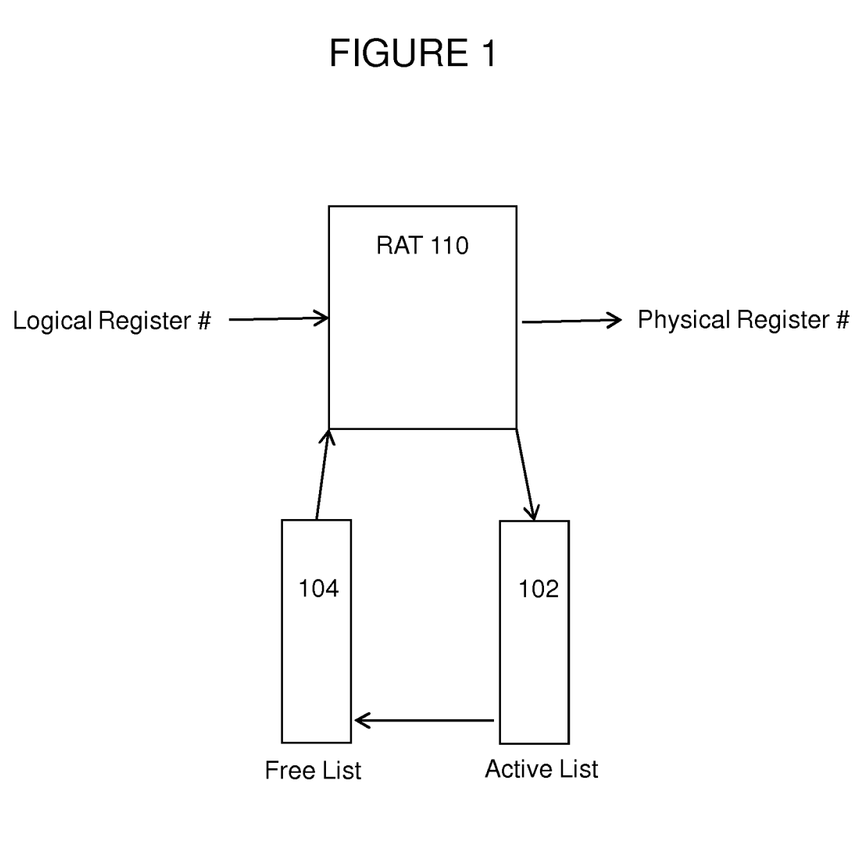
FIG. 1 illustrates a register renaming and dependency tracking scheme.

Illustrated in FIG. 1 is a register renaming and dependency tracking scheme involving three structures: RAT 110, active list (AL) 102, and free list (FL) 104. For each logical register specified by a renamed instruction, an unused physical register from FL 104 is allocated and RAT 110 is updated with this new mapping. Physical registers are free to be used again (i.e., reclaimed) once they are not referenced anymore by instructions in the current instruction window.

Based upon the data structures depicted in FIG. 1, one method for register reclaiming is to reclaim a physical register only when the instruction that evicted it from RAT 110, i.e., the instruction that created a new mapping to the physical register, retires. As a result, whenever a new mapping updates RAT 110, the evicted old mapping is pushed into AL 102. (An AL entry is associated with each instruction in the instruction window.) When an instruction retires, the physical register of the old mapping recorded in AL 102, if any, is reclaimed and pushed into FL 104. This cycle is depicted in FIG. 1.

For many instructions, one of the source registers is also used as the destination register. If the value stored in this source register is needed by subsequent (in program order) instructions, a register-move instruction may be inserted prior to the subsequent instruction to copy the source operand in the source register to another logical location so that it can be accessed by the subsequent instruction.

Another reason for the insertion of register-move instructions is to set the parameter values in the appropriate registers prior to a procedure call.

As a result, the number of register-move instructions may be quite significant. Therefore, it may be desirable to provide for the efficient execution of register-move instructions with efficient register renaming and reclaiming schemes.

In FIG. 2, the register renaming functional unit is indicated by renamer unit 208, where RAT 210 stores current mappings between logical registers and physical registers. The physical registers are indicated by register file 212. Every logical register has a mapping to a physical register in physical register file 212, where the mapping is stored in RAT 210 as an entry. An entry in RAT 210 is indexed by a logical register and contains a pointer to a physical register in physical register file 212. Some registers in physical register file 212 may be dedicated for integers whereas others may be dedicated for floating point numbers or packed data, but for simplicity these distinctions are not indicated in FIG. 2.

During renaming of an instruction, current entries in the RAT provide the required mapping for renaming the source logical register(s) of the instruction, and a new mapping is created for the destination logical register of the instruction. This new mapping evicts the old mapping in the RAT, and the RAT is updated with the new mapping.

Table 1 illustrates an example of register renaming. In Table 1, four instructions in original program order are provided in the first column. Renamed instructions are indicated in the second column. Next to each renamed instruction are the current entries in the RAT after instruction renaming. The final column provides the mapping evicted by instruction renaming. For simplicity, only three logical registers, LRa, LRb, and LRc, are considered. A physical register is denoted by PRi where i is an integer. The first entry in Table 1 provides the current state of the RAT before the first listed instruction is renamed.

For example, in Table 1 the first instruction LRa+2→LRa (indicating that the immediate 2 is added to the value in logical register LRa and the result is stored in logical register LRa) is renamed to PR1+2→PR2, where physical register PR2 was assumed to be available. For this instruction, a new mapping LRa→PR2 was created and the old mapping LRa PR1 was evicted from the RAT.

Note that there is a true dependence of the second and fourth instructions upon the first instruction, and a true dependence of the third instruction upon the second instruction. However, register renaming has removed the output dependency between the second and fourth instructions, as well as the anti-dependence between the third and fourth instructions, so that the second, third, and fourth instructions may be executed out of order provided the execution order follows the various true dependencies.

TABLE 1

| Instruction | Renamed Instruction | RAT | Evicted Mapping |
|---|---|---|---|
| ... | ... | LRa → PR1<br>LRb → PR11<br>LRc → PR10 | ... |
| LRa + 2 → LRa | PR1 + 2 → PR2 | LRa → PR2<br>LRb → PR11<br>LRc → PR10 | LRa → PR1 |
| LRa + 3 → LRb | PR2 + 3 → PR12 | LRa → PR2<br>LRb → PR12<br>LRc → PR10 | LRb → PR11 |
| LRb + 2 → LRc | PR12 + 2 → PR13 | LRa → PR2<br>LRb → PR12<br>LRc → PR13 | LRc → PR10 |
| LRa + 5 → LRb | PR2 + 5 → PR14 | LRa → PR2<br>LRb → PR14<br>LRc → PR13 | LRb → PR12 |

Renamed instructions are placed in instruction window buffer 216. Entries in instruction window buffer 216 contain the opcode of the renamed instruction, as well as other fields to be described later. For this embodiment, the results of instructions are not stored in buffer 216 but reside in physical register file 212.

Instruction window buffer 216 allows for instruction retirement in original program order. For CISC architectures, a complex instruction is retired when all micro-instructions making up the complex instruction are retired together. Buffer 216 is operated as a circular buffer, where a first pointer points to the next instruction to be retired and a second pointer points to the next available entry for a newly decoded instruction. Incrementing of the pointers is done in modulo-N arithmetic, where N is the number of available entries in buffer 216. When an instruction retires, the first pointer is incremented. When a decoded instruction is placed in buffer 216, the second pointer is incremented. The pointers are incremented by one for each decoded instruction in a RISC architecture, and may be incremented by more than one for CISC architectures.

For a store instruction that writes its result to a memory location, data cache 214 (part of the memory hierarchy) is updated upon instruction retirement. For an instruction that writes its result to a logical register, no write need be done upon retirement because there are no registers dedicated as logical registers. For such an instruction, physical register file 212 has the result of the retiring instruction in the physical register to which the destination logical register was mapped when the instruction was renamed.

Scheduler 218 schedules instructions to execution units 220 for execution. The scheduling function may, for example, be realized by reservation stations (not shown) implementing Tomasulo's algorithm (or variations thereof). Execution units 220 may retrieve data from or send data to data cache 214 or physical register file 212, depending upon the instruction (or micro-instruction) to be executed.

In other embodiments of the present invention, the information content contained in the data structures of physical register file 212 and instruction window buffer 216 may be realized by different functional units. For example, a re-order buffer may replace instruction window buffer 216 and physical register file 212, so that results are stored in the re-order buffer, and in addition, registers in a register file are dedicated as logical registers. For this type of embodiment, the result of an instruction specifying a write to a logical register is written to a logical register upon instruction retirement.

We now distinguish two types of move instructions: register-to-register moves and immediate-to-register moves. In a register-to-register move, a value is moved from one register, the source logical register, to another register, the destination logical register. In an immediate-to-register move, an immediate value is moved to a logical register.

In embodiments of the present invention, move instructions are executed by mapping more than one logical register to the same physical register. The execution of a register-to-register move instruction is performed by mapping the destination logical register of the move instruction to the physical register mapped by the source logical register of the move instruction.

The execution of an immediate-to-register move instruction is performed by accessing value-matching cache 224. Entries in value matching cache 224 are indexed by values, where a cache entry associates a value with a physical register storing that value. Value matching cache 224 may have fewer entries than the number of physical registers. If there is a hit in value matching cache 224, then the destination logical register of the move instruction is mapped to the physical register indicated by value-matching cache 224. If there isn't a hit, then the move execution is performed as in prior art architectures, and value-matching cache 224 is updated.

Physical register file 212 may itself serve the function of a value-matching cache, so that cache 224 is not needed. In this case, register file 212 would need an extra port to perform parallel tag matching, where the tag is the value stored in a physical register.

As discussed above, register-to-register move instructions and immediate-to-register move instructions (provided there is a hit in value-matching cache 224 for the latter type of move) are executed by creating multiple mappings in which more than one logical register is mapped to the same physical register. Effectively, such move instructions are "eliminated" in the sense that they no longer are performed by execution units 220. Instead, move instructions are performed during the renaming stage. These instructions remain in instruction window buffer 216 ready to be retired. Dependency graphs are collapsed since instructions dependent on such move instructions are made directly dependent on the real producer (dependencies are redirected). There may also be a reduction in the requirement for physical registers, and there may be fewer writes into the register file.

Embodiments of the present invention provide a mechanism for mapping more than one logical register to the same physical register (a many-to-one mapping). These many-to-one mappings are facilitated by utilizing physical register table 230, which may represent a table or any other data structure, implemented in hardware, to store any number of entries as described below. In one embodiment, physical register table 230 may include eight entry locations.

Figure 3:
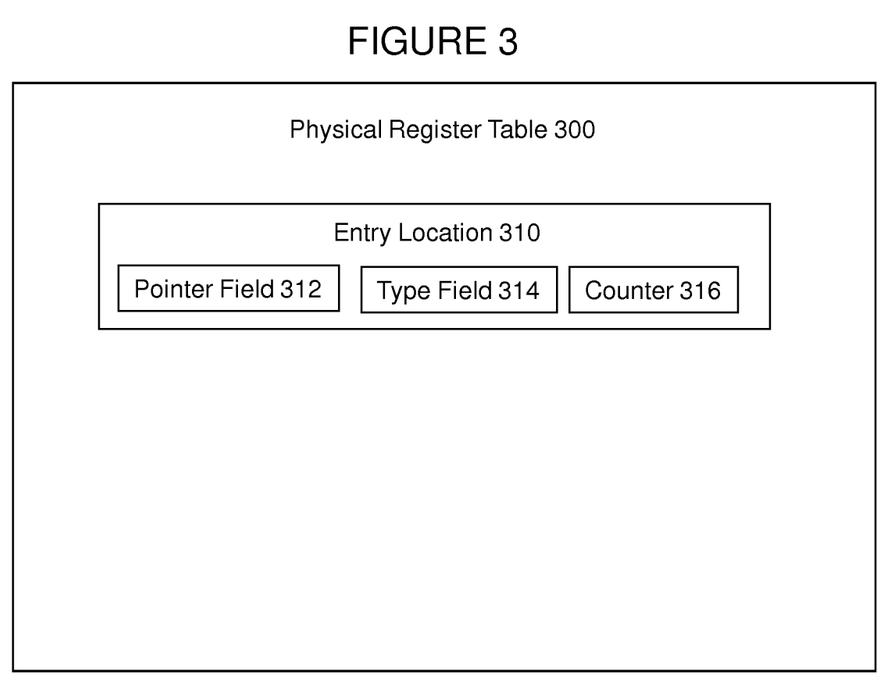
FIG. 3 illustrates a physical register table according to an embodiment of the present invention.

FIG. 3 illustrates physical register table 300 according to an embodiment of the present invention, where an embodiment of physical register table 300 may serve as physical register table 230 in FIG. 2.

Each entry in physical register table 300 is a record of the physical register file location and type (e.g., integer or floating point or packed data) for a move instruction that has been eliminated. For example, entry location 310 in physical register table includes pointer field 312 and type field 314. Pointer field 312 may be used to store a pointer to a physical register and type field 314 may be used to store a value to indicate the register type.

Each entry in physical register table 300 may also include counter 316. The value of counter 316 may be used to indicate the number of logical copies of the associated physical register. Note that embodiments of a physical register table need not include counters.

Each time a move instruction is eliminated, a new mapping between a logical register and a physical register is created, and physical register table 300 is checked for an entry allocated to that physical register. If no such entry exists, a new table entry may be created (assuming at least one entry location is available; if not, see below) by storing a pointer to that physical register in pointer field 312 of the available entry location and a value indicating the type of that physical register in type field 314 of the available entry location. The value of counter 316 of the available entry location may be set (or it may already be set by default) to a particular value (e.g., 1) to indicate that a new logical copy of the associated physical register has been created. In an embodiment of a physical register table without counters, the presence of an entry indicates that there are two logical copies of the associated physical register.

If, on the other hand, an entry already exists for that physical register, the counter for that entry may be changed by a first increment. In some embodiments, the first increment is positive, so that the counter is incremented for each new mapping. When a particular mapping to a physical register is no longer needed, its counter is changed by a second increment, opposite in sign to the first increment.

If, however, an entry already exists for that physical register and the associated counter is saturated (e.g., set to its maximum value), a new table entry may be created as described above. In this case, there may be more than one entry location allocated to the same physical register, and the total number of logical copies of that physical register may be indicated based on the sum of the counter values from all such entry locations (e.g., the sum plus 1).

In an embodiment of a physical register table without counters, if an entry already exists for a particular physical register, a new entry for the same physical register may be created to indicate that there is another logical copy of that physical register.

In the event that all of the entry locations in physical register table 300 become filled, no move instructions may be eliminated until an entry location becomes available.

A physical register becomes free again if there are no longer any mappings to it that are needed by in-flight instructions. Each time an instruction that evicts a mapping to a physical register is retired, the entry for that physical register in physical register table 300 is found. In the event that more than one such entry exists, only one such entry needs to be identified. The counter in that entry is changed by the second increment (e.g., the counter is decremented). When a counter reaches a pre-determined value (e.g., zero), that entry is evicted (e.g., cleared or marked invalid) and that entry location becomes available. If that entry is the only entry for that physical register, then that physical register becomes free, and it is removed from the active list and added to the free list. In an embodiment without counters, each time an instruction that evicts a mapping to a physical register is retired, the physical register table entry for that physical register is evicted and its entry location becomes available, and if that entry is the only entry for that physical register, then that physical register becomes free.

In this way, the use of physical register table 230 ensures that no physical register is lost during the cycle depicted in FIG. 1. The maximum number of concurrent mappings to a given physical register depends upon the number of entries in physical register table 230 and the number of bits allocated to each associated counter. Note that there may be more mappings than there are logical registers, because the number of instructions in flight may (and most likely will) be larger than the number of logical registers.

In an embodiment with counters, the counter may be able to recover to a previous state after a branch mispredict, an interrupt, or other such event, for example, in order to handle speculation. In embodiments with the physical register reclaim point in the non-speculative region of the pipeline, physical register table updates may be completed in the non-speculative region of the pipeline prior to the physical register reclaim point. In embodiments with the physical register reclaim point in the speculative region of the pipeline, a non-speculative copy of the physical register table valid bits may be maintained to assist in recovery.

Table 2 provides an example of register re-use for a register-to-register move instruction. Table 2 is similar to Table 1, except that the third instruction is changed to a register-to-register move instruction, and an additional column is added to indicate the current state of the physical register table.

The first entry in Table 2 provides the current state of the RAT and the physical register table before the first display instruction is renamed.

Next to each renamed instruction is a pointer indicating the physical register named in the evicted mapping. For example, when the first displayed instruction is placed in the instruction window buffer, the pointer field associated with its entry is set to point to physical register PR3 because the renamed instruction evicted the mapping LRb→PR3.

The second displayed instruction in Table 2 is a register-to-register move and re-uses physical register PR2 so that its destination logical register is mapped to the same physical register mapped by its source logical register. Execution of this move instruction is performed by the renaming, but an entry in the instruction buffer window is still provided so that the pointer field associated with its entry is set to point to physical register PR4. Furthermore, because physical register PR2 has been allocated in the new mapping LRc→PR2, an entry for it is added to the physical register table.

The third displayed instruction in Table 2 is also a register-to-register move and re-uses physical register PR2 so that its destination logical register is mapped to the same physical register mapped by its source logical register. Execution of this move instruction is performed by the renaming, but an entry in the instruction buffer window is still provided so that the pointer field associated with its entry is set to point to physical register PR1. Furthermore, because physical register PR2 has been allocated in the new mapping LRa→PR2, the counter in the physical register table entry for physical register PR2 is incremented from one to two.

As described previously, for some embodiments when an instruction retires, the counter for the physical register table entry corresponding to its associated pointer field is decremented. As a simple example, suppose in Table 2 the instruction window has only the three instructions displayed, and the first displayed instruction is retired. Because the first renamed instruction has a pointer to physical register PR3, the counter for the physical register table entry for PR3 is decremented. If the counter is decremented from one to zero, then physical register PR3 is now free to be used again.

TABLE 2

| Instruction | Renamed Instruction with pointer | RAT | Evicted Mapping | Physical Register Table |
|---|---|---|---|---|
| . . . | . . . | LRa →PR1<br>LRb →PR3<br>LRc →PR4 | . . . | |
| LRa + 2 →LRb | PR1 + 2 →PR2; 3 | LRa →PR1<br>LRb →PR2<br>LRc →PR4 | LRb →PR3 | |
| LRb →LRc | PR2 →PR2; 4 | LRa →PR1<br>LRb →PR2<br>LRc →PR2 | LRc →PR4 | $POINTER_0 = 2, C_0 = 1$ |
| LRb →LRa | PR2 →PR2; 1 | LRa →PR2<br>LRb →PR2<br>LRc →PR2 | LRa →PR1 | $POINTER_0 = 2, C_0 = 2$ |

Figure 4:
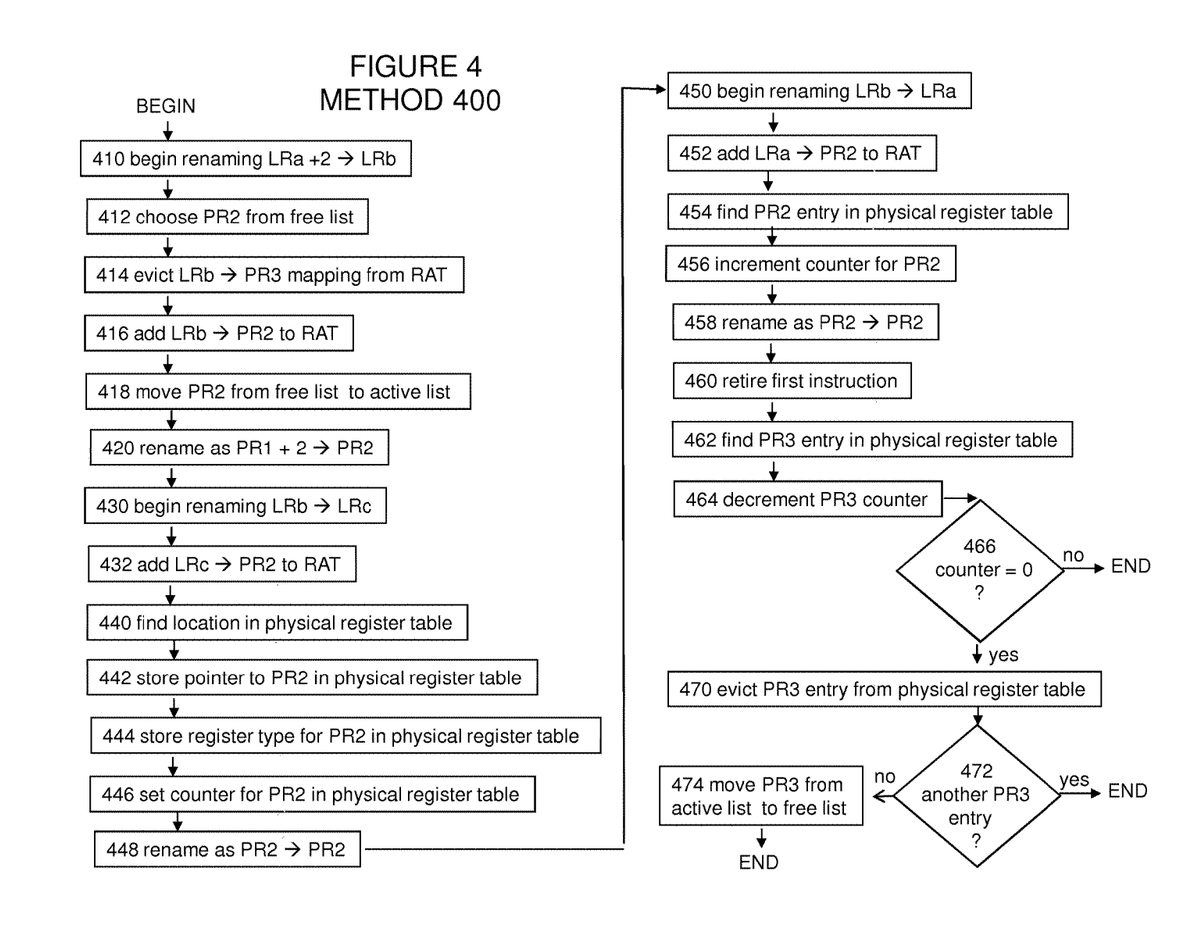
FIG. 4 illustrates a flow diagram for executing move instructions according to an embodiment of the present invention.

A flow diagram illustrating the elimination of a register-to-register move instruction according to method 400, an embodiment of the present invention is shown in FIG. 4. Although method embodiments of the invention are not limited in this respect, reference may be made to elements of FIGS. 1, 2, and 3 to help describe the method embodiment of FIG. 4.

In box 410, register renaming (e.g., by renamer unit 208) for a first instruction (e.g., LRa+2→LRb) begins. In box 412, a physical register (e.g. PR2) is chosen from the free list (e.g., FL 104) for renaming of the destination logical register (e.g., LRb). A mapping (e.g., LRa→PR1) for the source logical register (e.g., LRa) already exists in the RAT (e.g., RAT 110), and that mapping's physical register (e.g., PR1) is already on the active list (e.g., AL 102). Assume also that a mapping (e.g., LRb→PR3) for the destination logical register (e.g., LRb) already exists in the RAT (e.g., RAT 110), and that mapping's physical register (e.g., PR3) is already on the active list (e.g., AL 102).

In box 414, the existing mapping (e.g., LRb→PR3) for the destination logical register (e.g., LRb) is evicted from the RAT (e.g., RAT 110). In box 416, a new mapping (e.g., LRb→PR2) is created in the RAT for renaming of the destination logical register (e.g., LRb). In box 418, the new mapping's physical register (e.g., PR2) is removed from the free list (e.g., FL 104) and added to the active list (e.g., AL 102). In box 420, the first instruction is renamed (e.g., PR1+2→PR2).

In box 430, register renaming (e.g., by renamer unit 208) for a second instruction (e.g., LRb→LRc) begins. The second instruction is a register-to-register move instruction that may be eliminated according to an embodiment of the present invention. In box 432, a new mapping (e.g., LRc→PR2) is created in the RAT for renaming of the destination logical register (e.g., LRc) to the same physical register (e.g., PR2) to which the source logical register is mapped (e.g., LRb).

In box 440, an entry location for a new entry in the in the physical register table (e.g. physical register table 300) is found. In box 442, a pointer to the physical register (e.g. PR2) for the new mapping is stored in the pointer field (e.g., pointer field 312) of the new entry. In box 444, a value for the type of the physical register (e.g. integer) is stored in type field (e.g., type field 314) of the new entry. In box 446, the counter (e.g., counter 316) of the new entry is set to 1. In box 448, the second instruction is renamed (e.g., PR2→PR2).

In box 450, register renaming (e.g., by renamer unit 208) for a third instruction (e.g., LRb→LRa) begins. The third instruction is a register-to-register move instruction that may be eliminated according to an embodiment of the present invention. In box 452, a new mapping (e.g., LRa→PR2) is created in the RAT for renaming of the destination logical register (e.g., LRa) to the same physical register (e.g., PR2) to which the source logical register is mapped (e.g., LRb).

In box 454, the entry for that physical register (e.g., PR2) is found in the physical register table (e.g. physical register table 300). In box 456, the counter (e.g., counter 316) for that entry is incremented to indicate the creation of another mapping to that physical register. In box 458, the third instruction is renamed (e.g., PR2→PR2).

In box 460, the first instruction retires. In box 462, the physical register table entry for the physical register (e.g., PR3) in the mapping evicted from the RAT for the renaming of the first instruction is found. In box 464, the counter for that entry is decremented. In box 466, it is determined whether the counter for that entry is zero. If so, method 400 continues to box 470. If not, method 400 may end.

In box 470, that entry is evicted from the physical register table. In box 472, it is determined whether another entry for that physical register (e.g., PR3) exists in the physical register table. If not, method 400 continues to box 474. If so, method 400 may end. In box 474, that physical register (e.g., PR3) is removed from the active list and added to the free list.

In various embodiments of the present invention, the method illustrated in FIG. 4 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of method 400 may be embodied in software or firmware instructions that are stored on a medium readable by processor 200, which when executed by processor 200, cause processor 200 to execute part of all of an embodiment of the present invention. Also, aspects of the present invention may be embodied in data stored on a machine-readable medium, where the data represents a design or other information usable to fabricate all or part of processor 200.

Thus, embodiments of an invention for a physical register table for eliminating move instructions have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims. In the claims below, the term "instruction" may encompass an instruction in a RISC architecture or an instruction in a CISC architecture, as well as instructions used in other computer architectures.

We claim:
1. A processor comprising:
   a physical register file including a plurality of physical registers;
   a register allocation table (RAT) including a plurality of RAT mapping locations, each (RAT) mapping location to store a RAT mapping of one of a plurality of logical registers to one of a plurality of physical registers; and
   a physical register table (PRT), implemented in hardware, including a plurality of PRT entry locations, each PRT entry location to store a PRT entry to indicate that one of the physical registers in a RAT mapping has been allocated in an elimination of a register-to-register move instruction, the PRT entry including a pointer to the one of the physical registers that has been allocated in the elimination of the register-to-register move instruction, the PRT entry including a RAT mapping counter to count RAT mappings to the one of the physical registers, wherein the number of PRT entry locations is less than the number of physical registers in the physical register file.

2. The processor of claim 1, further comprising an active list, wherein if the only PRT entry including a first physical register is evicted from the PRT, the first physical register is removed from the active list.

3. The processor of claim 1, further comprising a free list, wherein if the only entry including a first physical register is evicted from the PRT, the first physical register is added to the free list.

4. The processor of claim 1, wherein each PRT entry is also to indicate a register type.

5. The processor of claim 1, further comprising a renamer to create the RAT mappings.

6. A method comprising:
   storing a first RAT mapping of a first logical register to a first physical register in a register allocation table (RAT) to eliminate a first register-to-register move instruction, the first physical register in a physical register file having a first number of physical registers;
   creating a first PRT entry for the first physical register in a physical register table (PRT), implemented in hardware, to indicate that the first physical register in the mapping has been allocated in the elimination of the first register-to-register move instruction, the first PRT entry including a pointer to the first physical register, the PRT having a second number of (PRT) entry locations less than the first number; and
   setting a RAT mapping counter in the first PRT entry.

7. The method of claim 6, further comprising choosing the first physical register from a free list before the mapping.

8. The method of claim 6, wherein creating also includes storing a register type in the PRT entry location.

9. The method of claim 6, further comprising:
   storing a second mapping of a second logical register to the first physical register in the RAT to eliminate a second register-to-register move instruction; and
   incrementing the RAT mapping counter in the first PRT entry.

10. The method of claim 6, further comprising:
    evicting a second mapping to a second physical register from the RAT;
    retiring an instruction for which the second mapping was evicted; and
    evicting a second PRT entry for the second physical register from the PRT.

11. The method of claim 10, further comprising decrementing a RAT mapping counter for the second PRT entry, and wherein evicting the second entry is in response to the counter being decremented to zero.

12. The method of claim 10, further comprising determining whether a third entry for the second physical register exists in the PRT.

13. The method of claim 10, further comprising removing the second physical register from an active list.

14. The method of claim 10, further comprising adding the second physical register to a free list.

15. A system comprising:
- a processor including
  - a physical register file including a plurality of physical registers;
  - a register allocation table (RAT) including a plurality of RAT mapping locations, each (RAT) mapping location to store a RAT mapping of one of a plurality of logical registers to one of a plurality of physical registers; and
  - a physical register table (PRT), implemented in hardware, including a plurality of PRT entry locations, each PRT entry location to store a PRT entry to indicate that one of the physical registers in a RAT mapping has been allocated in an elimination of a register-to-register move instruction, the PRT entry including a pointer to the one of the physical registers that has been allocated in the elimination of the register-to-register move instruction, the PRT entry including a RAT mapping counter to count RAT mappings to the one of the physical registers, wherein the number of PRT entry locations is less than the number of physical registers in the physical register file; and
- a system memory from which to load data into the physical register file and into which to store data from the physical register file.

* * * * *